United States Patent [19]

Wood

[11] Patent Number: 5,726,506

[45] Date of Patent: Mar. 10, 1998

[54] HOT INSERTION POWER ARRANGEMENT

[75] Inventor: Samuel F. Wood, Los Altos Hills, Calif.

[73] Assignee: Alantec Corporation, San Jose, Calif.

[21] Appl. No.: 465,164

[22] Filed: Jun. 5, 1995

[51] Int. Cl.$^6$ .................................................. H01B 7/30
[52] U.S. Cl. ............................ 307/147; 307/18; 307/64; 307/42; 395/283
[58] Field of Search ........................ 307/147, 64–66, 307/18, 19, 23, 42; 395/280, 281, 282, 283, 500; 439/59, 61, 62, 64, 377; 361/748, 752, 756, 760, 781, 58

[56] References Cited

U.S. PATENT DOCUMENTS

| | | | |
|---|---|---|---|
| 4,245,270 | 1/1981 | Busby | 361/58 |
| 4,675,538 | 6/1987 | Epstein | 307/64 |
| 5,099,187 | 3/1992 | Rippel | 320/1 |
| 5,268,592 | 12/1993 | Bellamy et al. | 307/43 |
| 5,272,584 | 12/1993 | Austruy et al. | 361/58 |
| 5,317,697 | 5/1994 | Husak et al. | 395/325 |
| 5,384,492 | 1/1995 | Carlson et al. | 307/147 |

*Primary Examiner*—Jonathan Wysocki
*Assistant Examiner*—Jonathan S. Kaplan

*Attorney, Agent, or Firm*—Skjerven, Morrill, MacPherson, Franklin & Friel; Brian D. Ogonowsky

[57] ABSTRACT

A plug-in module receives both primary and alternate power via mating connectors on the module and on the backplane. Multilevel connectors are used so that a module being inserted first receives alternate power and ground before primary power and signal connections are made. The initial connect to the alternate power supply directs the transient current to the alternate power supply through an isolating PN junction diode having a forward bias voltage drop of about 0.8 volts. When the module is fully inserted, the module is connected to both the primary and alternate power. Within each module the associated electrical load is now connected directly to the primary power bus. To prevent transient currents produced by the hot insertion of other plug-in modules from affecting the voltage level on the power bus, the primary voltage supply is connected to the primary power bus via a Schottky diode having a forward bias voltage of approximately 0.4 volts. Due to the lower voltage drop by the Schottky diode, the isolating PN junction diode is no longer forward biased when the primary power is connected to the module. The alternate power bus will thus supply power to the module only during the short time from initial insertion into the backplane until the module is fully inserted.

21 Claims, 2 Drawing Sheets

HOT INSERTION POWER ARRANGEMENT

FIELD OF INVENTION

The present invention relates to the interconnection of power units and replaceable modules in an electronic system and, more particularly, to an arrangement of connectors and diodes that allows modules to be replaced without requiring the system to be powered down.

BACKGROUND OF INVENTION

Many complex electronic and electrical systems are composed of modular subsystems. In a typical system, electronic components are mounted on a printed circuit card and interconnected to perform the intended function via metallic traces on the card's surfaces. One such card forms a modular subsystem. In order to connect two or more cards together to form complex functions, signal and power traces on each card are brought to connectors on the card edge. These edge connectors mate with complementary connectors mounted on another printed circuit board that serves to interconnect signals and power between modules. This printed circuit board is commonly referred to as a backplane or a motherboard.

One important purpose of the modular organization of systems is to allow replacement of modules in the event of failures. In some critical applications, it is required that modules be replaced while the system is still powered and operating. In such a system, the module being replaced must be removed from the backplane connector while power is applied and possibly while signals are being sent and received by other, non-failing modules. The new, presumably good, module must be inserted under the same circumstances. This capability of replacing modules in powered, functioning systems is often referred to as "hot" or "live" insertion. In a properly designed system of this type, modules are usually duplicated so that, while a failing module is being replaced, other modules can continue to carry out the intended system function without interruption. Continuous operation of this type is typical of, but not limited to, PBX's (private branch exchanges), telephone central offices, network bridges and routers, file servers, and industrial control equipment.

Extraction and insertion of modules in a powered and operating system presents several problems. First, the removal or replacement of a module must not disturb the signal lines on the backplane and thereby disturb the operation of other modules. Second, replacement must not create electrical conditions which would be injurious to the components on the module being replaced. Finally, the sudden increase or decrease in current from the module being replaced should not affect the common electrical power busses shared with other modules. The present invention is directed primarily at this final problem, although it has implications for the other two problems.

The basis of a solution to the first and second problems described above is to maintain power to the module while signal contacts are made and broken. With appropriate design, the signal pins can be placed in a quiescent state prior to insertion or extraction. Since power is maintained to the module, the quiescent signal lines will not disturb the signal bus.

One prior art solution is to provide module-to-backplane connectors with two levels of pins. The first level is longer and is designed to mate first. Typically, power and ground are provided on this first level. Signal connections are provided on the second level, which consists of shorter pins.

On insertion, the power and ground pins mate first, allowing the module to power up to a reset state in which the signal lines are quiescent. On extraction, the module must first be placed in a similar quiescent state, possibly by a manual signal, then the signal connections are broken first, while the module remains powered.

An alternative to multi-level contacts is to provide a connector in which the connections between the module and the backplane can be activated sequentially in response to a manual action, typically using a lever or a knob. Like the two-level connector above, the mechanical action is such that power and ground connections are made first on insertion and broken last on extraction.

A third alternative is the use of an "umbilical cord" to provide power to the module prior to insertion or extraction. The umbilical is designed to provide power to the module in parallel with the bus power and is attached temporarily when a module is to be replaced. As with the schemes described above, a means must be provided to place the module in a quiescent state during the replacement process.

For all the approaches discussed above, it is important that either the ground and power connections be made nearly coincidentally or the ground connection be made first, before power. This avoids applying a potential to components on the modules where no ground return is provided. If such a condition were to occur, damage might be done to the more sensitive components.

With respect to the third problem mentioned here, namely introduction of harmful transients on the system electrical bus, the above solutions are inadequate without additional considerations. The inadequacy of these approaches is related to the initial inrush of current to the module when it is first connected to the power and ground of the backplane. This inrush is due in particular to reactive elements in the module, such as capacitors, which must be charged before the module's current consumption stabilizes. The current inrush will not only affect the power supply, but, due to distributed resistance in the electrical bus itself, the current inrush will cause voltage fluctuations at other connected modules. These fluctuations may cause incorrect operation of these other modules.

One prior art solution is to provide resistive or inductive filtering on the power connections entering a module. This filtering limits the initial inrush of current to acceptable levels and allows the current to stabilize over a period of time. A drawback of this is that, when the component is in series with module power, it has the effect of reducing the operating voltage of the module. Proper filtering may also require several components leading to additional module cost.

An alternative prior art solution is to provide an independent power bus for the sole purpose of powering a single module during replacement. The umbilical cord solution discussed above can be used in this approach by connecting the umbilical to an alternate power source to provide advanced power to the board prior to insertion. Transients associated with powering the module are absorbed by the alternate power supply and do not affect the primary power bus. Once the module is fully inserted, and the module is powered by both the alternate and primary supplies, the umbilical can be removed. The reverse procedure reduces disturbances when a card must be removed. Since the umbilical cord solution requires additional board connectors, the umbilical itself, and a somewhat cumbersome replacement procedure, it is not optimal.

Another prior art solution is that proposed in U.S. Pat. No. 4,579,406, "Printed Circuit Board Connector System." This is directed at insertion and removal of modules similar to printed circuit cards. Primary power and signal connections are made through a standard connector with equal length pins. Alternate (or advanced) power and ground (from an isolated power source) are provided by a separate connector with two sliding contacts. The card surface that mates with the alternate power connector has two surface contacts aligned with the direction of insertion. Both contacts begin at the edge of the board, but the alternate power contact is shorter than the ground contact. When the board is partially inserted, power is supplied only by the alternate power and ground, and the primary power, ground and signal pins are not connected. During this stage, power transients on the alternate power bus will settle, and the signal lines will be brought to a quiescent state. As the board is more fully inserted, the primary power, ground, and signal connections are made. The board now receives power from both the primary and alternate supplies. In the final stage, when the board is fully inserted, the alternate power is removed, since the contact pad on the board is shorter than the reach of the sliding power contact. At this point, the board receives power only from the primary power supply. The disadvantage of this approach is the need for a specially designed "make-break" connector.

It is the purpose of the present invention to provide hot insertion of modules based on commonly available multilevel connectors using a minimum of additional components.

SUMMARY OF INVENTION

The present invention makes use of one or more power supplies, although typically several power supplies will be used for redundancy. Primary power, that power used to supply modules in normal operation, is derived by diode "ORing" of the power output of each supply. This power is supplied to all modules on the primary power bus. Alternate power is provided from a designated one of the power supplies directly to a separate alternate power bus, bypassing the associated "ORing" diode.

Each module receives both primary and alternate power via mating connectors on the module and on the backplane. Multilevel connectors are used so that a module being inserted first receives alternate power and ground before primary power and signal connections are made. This allows the module to power-up properly and directs the transient current to the alternate power supply, which is electrically isolated from primary power by the "ORing" diode. When the module is fully inserted, it is connected to both the primary and alternate power. Within each module the associated electrical load is connected directly to the primary power bus. However, the module electrical load is connected within the module to the alternate power bus through an "isolating" diode. By properly selecting the characteristics of each diode, the alternate power bus will supply power to the module only during the short time from initial insertion into the backplane until the card is fully inserted. Once full insertion occurs, the module obtains power only from the primary supply bus.

It is an object of this invention to provide a capability for inserting and extracting modules from a common power bus system without causing electrical transients that will affect operation of other connected modules.

It is a further object of the invention to provide this capability using simple multilevel connectors.

It is yet another object of this invention to provide hot insertion capability using only a few electrically simple components.

Other objects of the invention will become clear to those skilled in the art upon study of the attached drawings and text, that provide details of the preferred embodiment.

DETAILED DESCRIPTION OF THE PREFERRED EMBODIMENTS

Figure 1:
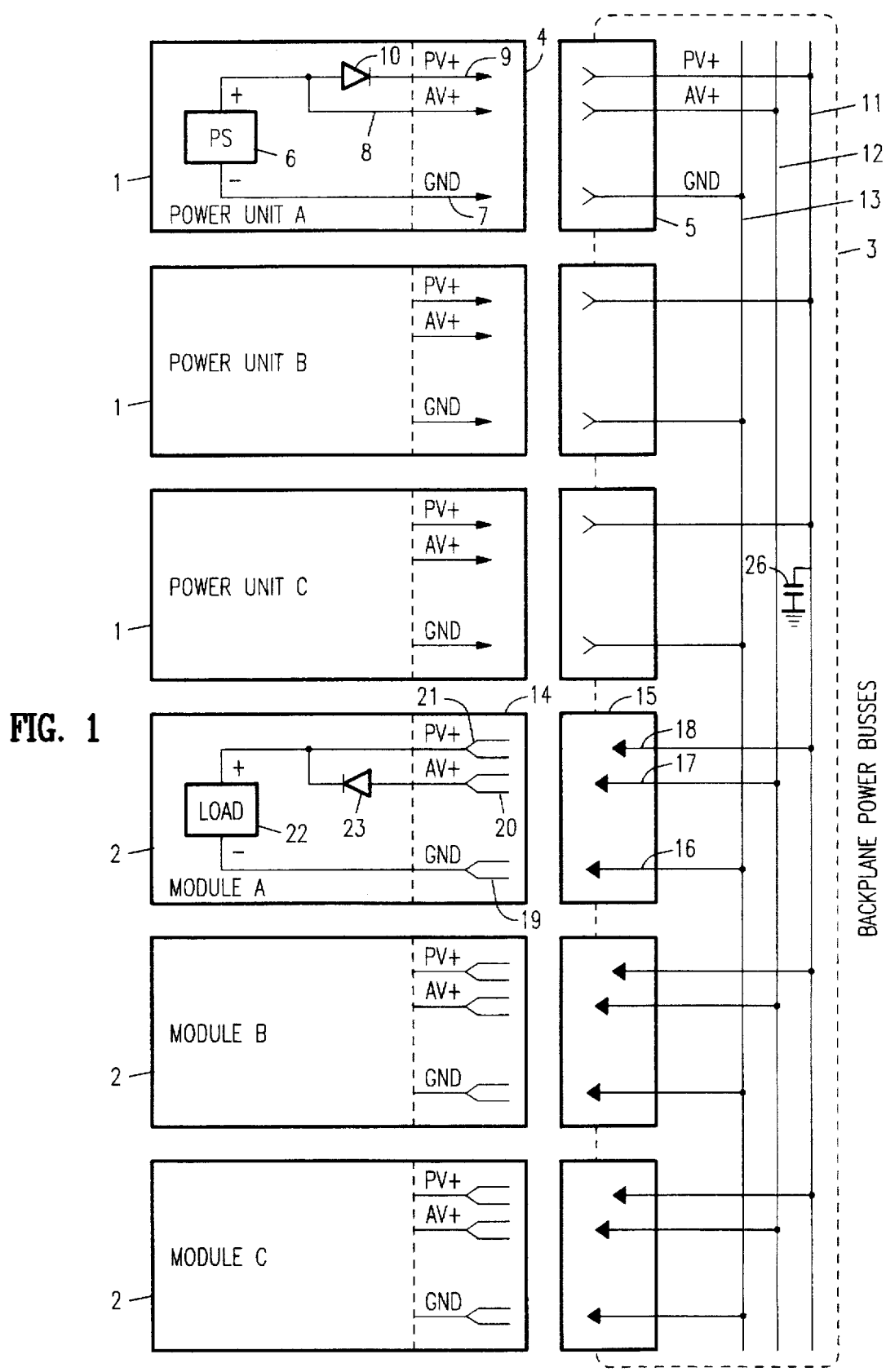
FIG. 1 illustrates the components of a system making use of the present invention.

FIG. 1 illustrates the invention as applied to a network bridge/router where continuous operation is critical. For purpose of illustrating the invention clearly, only the essential elements of the power distribution subsystem are shown. Details of the logic on individual modules are unimportant to the operation of the invention, except as discussed below.

In the preferred embodiment, there are two types of components: power units 1 and replaceable modules 2. These are interconnected by a backplane 3. In the example illustrated, there are three power units so that system operation can continue even if one of the power units fails. Although the actual system provides two voltage levels, +5V and +12V, the illustration in FIG. 1 is limited to the +5V power distribution. Distribution of +12V is identical.

Power units 1 are identical in structure and are connected via standard connectors so that failing units can be replaced easily and safely while power remains applied to the system from non-failing modules. Each power unit 1 has a male connector 4 which mates with a female connector 5 on the backplane Power unit A of FIG. 1 is an example of the internal structure of each power unit 1. Each power unit contains a power supply (PS) 6 of conventional construction and provides three points of connection through connector 4. One of the connections is Ground (GND) 7, providing a current return path. A second connection is Advanced Voltage (AV+) 8, corresponding to the direct output of the power supply 6. The third connection is Primary Voltage (PV+) 9. This is the output of the power supply after passing through the "ORing" diode On the power backplane 3, there are three power busses common to all power units and modules, corresponding to PV+ bus 11, AV+ bus 12, and GND 13. Only power unit A is connected to all three power busses via female connector 5. The remaining power units only make PV+ and GND connections to the bus, since the AV+ pin of their mating connector is not present. Thus, one of the power units 1, power unit A, is unique in that only it supplies AV+ to the backplane 3.

All power units 1 provide PV+ power to all modules 2 via the PV+ bus 11. Current sharing and protection against failure of one power unit 1 is provided by the "ORing" diode 10 in each power unit 1. Safety circuits in each power supply 6 guarantee that failure within this supply 6 will cause that supply to shut down, reverse biasing the "ORing" diode 10 of that supply while the forward biased "ORing" diodes in the remaining supplies will continue to provide PV+ current. In the preferred embodiment, each "ORing" diode 10 is a MBR6015L Schottky power rectifier diode from Motorola Semiconductor Products of Phoenix, Ariz.

Replaceable module A of FIG. 1 illustrates the internal structure of a typical replaceable module 2 in the system. In the preferred embodiment, these are printed circuit logic cards of conventional design containing processors, RAM, ROM, and other logic components. Each card connects to the power backplane 3 via a female connector 14 CBT20T00008FDS101-101 from ITT Canon of Santa Ana, Calif. On the backplane 3 is a corresponding male connector 15 CBC20J00-008WDP1-6-1 from ITT Canon. This particular male connector has pins of various lengths, as shown schematically in FIGS. 1 and 2. The longest pins (8.00 mm) 16 are connected to powerbus GND 13, while the next longest pins 17 (7.25 mm) connect to AV+ bus 12. Finally, the shortest pins 18 (6.25 mm) connect to PV+ bus 11. Finally, signal pins (not shown) are connected once all power pins have made contact.

All modules 2 have a structure identical to that illustrated for module A with respect to connection to the power bus. Female connector pins 19 and 21 from module connector 14 are connected directly to the load 22 of the card. In the preferred embodiment, this connection is made via printed circuit traces and power planes of conventional design. AV+ (Advanced Voltage) is connected through a female connector pin 20 to the load through an isolation diode 23 as shown. This diode is a GI1301 (6.0A, 50V) diode from General Instruments of Hicksville, N.Y.

The "ORing" diodes 10 and isolation diodes 23 must be selected so that the forward voltage drop of the isolation diode 23 exceeds that of the "ORing" diode 10. For the preferred embodiment, the instantaneous forward voltage ($V_F$) of the isolation diode 23 at 3.0A and a junction temperature ($T_j$) of 25° C. is 0.800 volts. For the "ORing" diode 10, $V_F$ is 0.45 at $T_j$=25° C. and 30.0A. The voltage differential can be insured by making diode 10 a Schottky diode and diode 23 a conventional PN junction diode. The current flow through the "ORing" diodes 10 will generally exceed that of the isolation diode, since a few power units 1 will supply many modules.

In an alternate embodiment, diodes 10 and 23 may be replaced with other suitable non-linear devices for performing the same blocking functions as diodes 10 and 23.

The orientation of diodes 10 and 23 would be reversed, as appropriate, if power supply 6 were providing a negative voltage instead of a positive voltage.

Figure 2A:
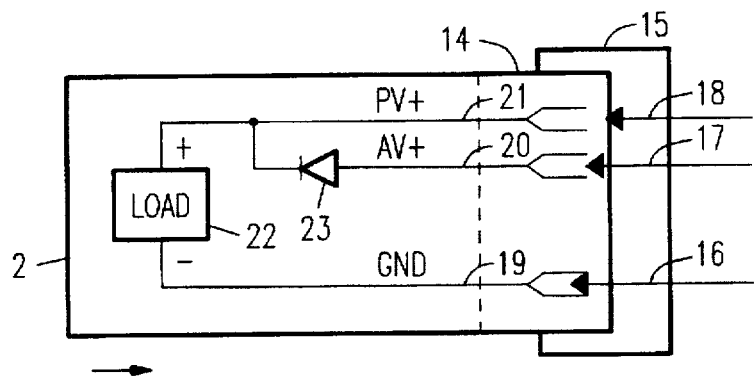
FIGS. 2A–2C show various stages by which a module of the invention is connected to a power bus.
Figure 2B:
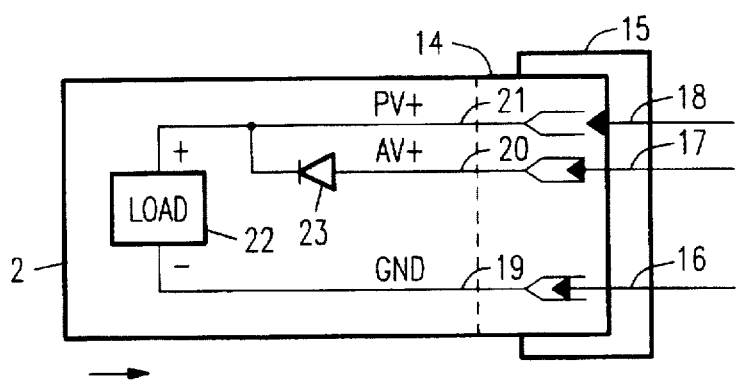

FIG. 2 shows the three insertion positions of a module 2 in sequence. Extraction would be the reverse. In FIG. 2A, the longest pin (or pins) 16 of the male module connector 15 are engaged with the corresponding pin (or pins) 21 on the female connector 14. This completes the circuit between the GND bus and the module 2, thereby guaranteeing that the ground connection is made before any power is applied from the Pv+ bus 11 or AV+ bus 12. In FIG. 2B, the module is shown in the second insertion position. At this point, the second longest male connector pin 17 has engaged the corresponding pin 20 on the female connector 14. Initial current to the module 2 flows through the isolation diode 23. All of the inrush current is provided by power unit A directly bypassing the "ORing" diode 10. Transients due to the inrush current are confined to the AV+ bus 12 and power unit A.

Figure 2C:
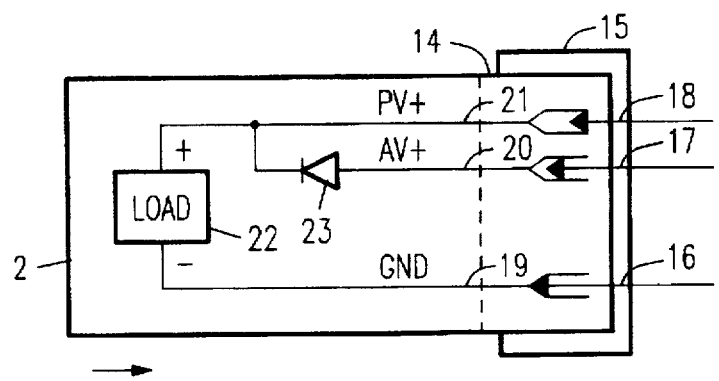

The final insertion position for the module 2 is shown in FIG. 2C. At this point, all power pins 19, 20, 21 on the module connector 14 are engaged. Power pin PV+ 18 is the last pin of the backplane connector 15 to be engaged. In this final position, all current to the module 2 flows through the PV+ pin 21 and the associated PV+ bus 11. This occurs because the forward voltage of the isolation diode 23 is higher than that of the "ORing" diode 10. Thus, the isolation diode 23 will be reverse biased during normal operation. The time between application of AV+ and PV+ depends on the difference in length between the pins 16 and 17 and the speed at which the module is inserted. Typically, this time will be in the order of several milliseconds. Transients due to the current inrush are absorbed by the power unit A supplying the AV+ bus 12 and do not propagate on the primary power PV+ bus 11. Transients on AV+ bus 12 are a function of the impedance of the power unit A, the impedance of the AV+ bus 12, and characteristics of the module 2. Typically, these transients dissipate within tens of microseconds, long before the final insertion position of the module 2 is reached.

A small transient is encountered when the load switches from pin 17 to pin 18. This transient will be under the ±0.5 volt tolerance of the 5-volt power supply and has no effect.

Extraction is the reverse process. To properly prepare the logic of the module 2 to be extracted, it is advisable to provide an advanced indication that the extraction is about to occur.

Although pins 16–18 are shown staggered, the concepts of this invention apply equally when pins 19–21 are staggered instead of pins 16–18.

The preferred embodiment has been described in terms of systems with several power units 1. However, the invention may be applied beneficially to systems with only a single power unit A provided the characteristics of the power units 1, modules 2, and backplane 3 are appropriate. In particular, the impedance of the power unit A should be substantially less than that of the backplane 3 and the modules 2. The impedance of the AV+ bus 12 should be substantially greater (e.g., ten times greater) than the impedance of the PV + bus 11. Under these conditions, which are typical of multi-module systems, the transients due to insertion of a module 2 are directed via the AV+ bus 12 to the power unit A and do not interact with the PV+ bus 11. The transients due to module insertion are harmlessly absorbed by the power unit A.

Additional steps can be taken to lower the impedance of PV+ bus 11 independently of assuring that the power supply impedance remains low. For example, electrolytic capacitors can be connected between PV+ bus 11 and ground 13. These capacitors supply the charge that is lost due to the transient when the module is inserted. Such capacitors may also be connected within the power units or distributed among the modules themselves.

It should be understood that each power unit 1 may provide multiple voltages to respective busses, and these voltages may be coupled to modules in the same way described with respect to FIGS. 1 and 2.

Details of the invention have been described with respect to the preferred embodiment. Those skilled in the art will recognize that changes in form and details may be made without departing from the spirit of the invention.

| Item | Description |
| --- | --- |
| 1 | Power Unit |
| 2 | Replaceable Module |
| 3 | Power Backplane |
| 4 | Power Unit Male Connector |
| 5 | Backplane Female Connector for Power Unit |
| 6 | Power Subsystem of a Power Unit |
| 7 | Power Unit Ground |
| 8 | Power Unit AV+ (Advanced Power) |
| 9 | Power Unit PV+ (Primary Power) |

-continued

| Item | Description |
| --- | --- |
| 10 | "ORing" Diode |
| 11 | PV+ Bus |
| 12 | AV+ Bus |
| 13 | Ground Bus |
| 14 | Replaceable Module Female Connector |
| 15 | Replaceable Module Male Connector |
| 16 | Longest Pin of Replaceable Module Male Connector |
| 17 | Medium Length Pin of Replaceable Module Male Connector |
| 18 | Shortest Length Pin of Replaceable Module Male Connector |
| 19 | GND Female Pin of Replaceable Module |
| 20 | AV+ Female Pin of Replaceable Module |
| 21 | PV+ Female Pin of Replaceable Module |
| 22 | Replaceable Module Load |
| 23 | Isolation Diode |

What is claimed is:

1. A system comprising:

a first power bus for conducting a reference potential;

a second power bus for conducting a primary power supply voltage;

a third power bus for conducting an advance power supply voltage;

a first power source providing said reference potential and a first voltage, said reference potential being coupled to said first power bus, said first voltage being coupled directly to said third power bus, said first voltage being coupled to said second power bus through a first non-linear device, said first non-linear device allowing current to flow between said first power source and said second power bus in only a first direction, said first non-linear device having a first voltage drop across said first non-linear device when a first current flows through said first non-linear device in said first direction;

a first plug-in module having a first module pin for connection to a first power bus pin connected to said first power bus, a second module pin for connection to a second power bus pin connected to said second power bus, and a third module pin for connection to a third power bus pin connected to said third power bus, a load in said first plug-in module being coupled to said third module pin through a second non-linear device, said second non-linear device allowing current to flow between said third power bus and said load in only said first direction, said second non-linear device having a second voltage drop across said second non-linear device when said first current flows through said second non-linear device in said first direction, said second voltage drop being of greater magnitude than said first voltage drop, said load being connected directly to said second module pin, said first module pin, said second module pin, said third module pin, said first power bus pin, said second power bus pin, and said third power bus pin being configured such that when said first plug-in module is inserted for electrical connection to said first power bus, said second power bus, and said third power bus, said third power bus pin makes electrical contact with said third module pin before said second power bus pin makes electrical contact with said second module pin, and said first power bus pin makes electrical contact with said first module pin before said second power bus pin makes electrical contact with said second module pin, whereby an initial connection of said reference potential and said advance power supply voltage to said load in said first plug-in module, before a connection of said primary power supply voltage to said load, enables said load to be placed in a substantially quiescent state prior to connection to said primary power supply voltage.

2. The system of claim 1 wherein said first non-linear device comprises a first diode and said second non-linear device comprises a second diode.

3. The system of claim 2 wherein an anode of said first diode is connected to said first voltage provided by said first power source and a cathode of said first diode is connected to said second power bus, and wherein an anode of said second diode is connected to said third power bus and a cathode of said second diode is connected to said load within said first plug-in module.

4. The system of claim 2 wherein said first diode is a Schottky diode and said second diode is a PN junction diode.

5. The system of claim 1 wherein lengths of said first power bus pin, said second power bus pin, and said third power bus pin are staggered such that said second power bus pin is shorter than either said first power bus pin or said third power bus pin so as to be last connected to said first plug-in module.

6. The system of claim 5 wherein said third power bus pin is shorter than said first power bus pin such that said first module pin makes contact with said first power bus pin prior to said third module pin making contact with said third power bus pin.

7. The system of claim 1 wherein said first power bus pin makes contact with said first module pin prior to said third power bus pin making contact with said third module pin.

8. The system of claim 1 wherein said first power source comprises a plug-in power module which is one of a plurality of plug-in power modules connected to said first power bus and said second power bus.

9. The system of claim 1 wherein said first power bus, said second power bus, and said third power bus are part of a backplane for receiving a plurality of plug-in modules.

10. The system of claim 1 further comprising a second plug-in module having power pins identical to said first module pin, said second module pin, and said third module pin, said second plug-in module being connected to said first power bus, said second power bus, and said third power bus via power bus pins identical to said first power bus pin, said second power bus pin, and said third power bus pin.

11. The system of claim 1 wherein said reference potential is a ground potential, wherein said primary supply voltage is a positive voltage, and wherein said advance power supply voltage is also a positive voltage.

12. The system of claim 1 wherein said load within said plug-in module comprises active electrical components for being powered by said primary power supply voltage after said first plug-in module has been connected to said first power bus, said second power bus, and said third power bus, said electrical components causing an inrush of current from said third power bus when connected to said third power bus.

13. The system of claim 1 wherein said first power bus pin, said second power bus pin, and said third power bus pin comprise female connectors, and said first module pin, said second module pin, and said third module pin comprise male connectors for plug-in to said female connectors.

14. The system of claim 1 wherein said first power bus pin, said second power bus pin, and said third power bus pin comprise male connectors, and said first module pin, said second module pin, and said third module pin comprise female connectors for receiving said male connectors.

15. The system of claim 1 wherein an impedance of said third power bus is higher than an impedance of said second power bus.

16. The system of claim 15 wherein one or more capacitors are connected between said second power bus and said first power bus to lower said impedance of said second power bus.

17. A method for energizing one or more plug-in modules when connecting to a backplane being supplied power by a power source, said power source providing a reference potential and a first voltage, said reference potential being coupled to a first power bus, said first voltage being coupled directly to a third power bus, and said first voltage being coupled to a second power bus through a first non-linear device, said first non-linear device allowing current to flow between said power source and said second power bus in only a first direction, said first non-linear device having a first voltage drop across said first non-linear device when a first current flows through said first non-linear device in said first direction, said method comprising the steps of:

providing a first plug-in module having a first module pin for connection to a first power bus pin connected to said first power bus, a second module pin for connection to a second power bus pin connected to said second power bus, and a third module pin for connection to a third power bus pin connected to said third power bus, a load in said first plug-in module being coupled to said third module pin through a second non-linear device, said second non-linear device allowing current to flow between said third power bus and said load in only said first direction, said second non-linear device having a second voltage drop across said second non-linear device when said first current flows through said second non-linear device in said first direction, said second voltage drop being of greater magnitude than said first voltage drop; and manually inserting said first plug-in module into said backplane for electrical connection to said first power bus, said second power bus, and said third power bus, such that said third power bus pin makes electrical contact with said third module pin before said second power bus pin makes electrical contact with said second module pin, and said first power bus pin makes electrical contact with said first module pin before said second power bus pin makes electrical contact with said second module pin, whereby an initial connection of said reference potential and said advance power supply voltage to said load in said first plug-in module, before a connection of said primary power supply voltage to said load, enables said load to be placed in a substantially quiescent state prior to connection to said primary power supply voltage.

18. The method of claim 17 wherein said first non-linear device comprises a first diode and said second non-linear device comprises a second diode.

19. The method of claim 18 wherein said first diode is a Schottky diode and said second diode is a PN junction diode.

20. The method of claim 17 wherein lengths of said first power bus pin, said second power bus pin, and said third power bus pin are staggered such that said second power bus pin is shorter than either said first power bus pin or said third power bus pin so as to be last connected to said first plug-in module.

21. The method of claim 20 wherein said third power bus pin is shorter than said first power bus pin such that said first module pin makes contact with said first power bus pin prior to said third module pin making contact with said third power bus pin.

* * * * *